J. STARK.
Turning Lathe.
No. 47,997. Patented May 30, 1865.
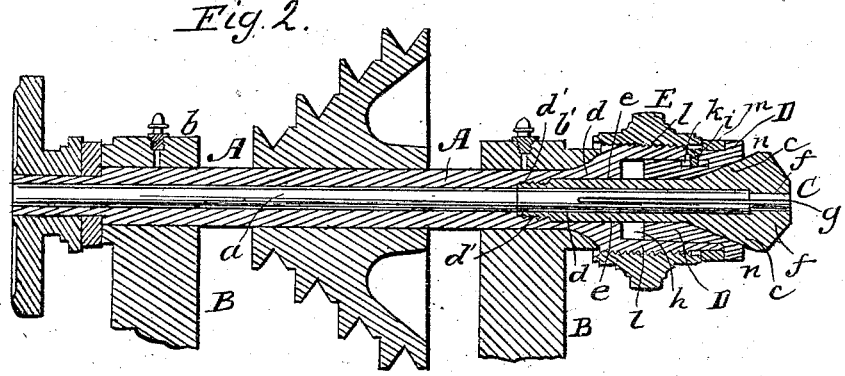
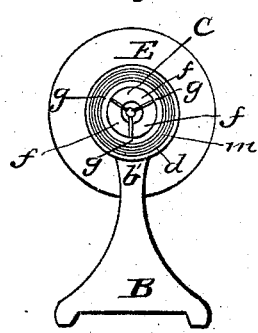
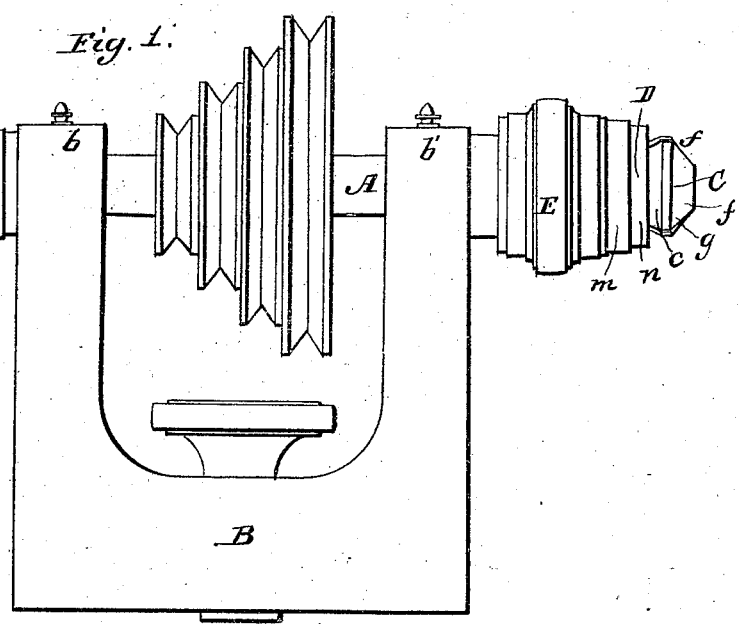
Witnesses:
Inventor:
John Stark
by his attorney

UNITED STATES PATENT OFFICE.

JOHN STARK, OF WALTHAM, MASSACHUSETTS.

IMPROVEMENT IN LATHES.

Specification forming part of Letters Patent No. 47,997, dated May 30, 1865.

*To all whom it may concern:*

Be it known that I, JOHN STARK, of Waltham, in the county of Middlesex and State of Massachusetts, have invented a new and useful Improvement in Lathes for Turning Articles from Wire, &c.; and I do hereby declare the same to be fully described in the following specification and represented in the accompanying drawings, of which—

Figure 1 is a side view, Fig. 2 a longitudinal section, and Fig. 3 a front end elevation, of a lathe-head stock and its arbor as provided with my invention.

The said invention is an improvement with reference to the lathe exhibited in Letters Patent of the United States, No. 21,824, and granted October 19, A. D. 1855, to George W. Daniels and Abraham Fuller. Like that, my improved lathe has a tubular arbor and certain devices applied thereto for enabling a rod to be extended into and through the arbor longitudinally thereof, and to be duly centered and clamped in place therein, and with its axis coincident with that of the arbor. However, the rod may vary in diameter within certain limits to which the clamps may be adapted. My invention is intended to overcome a difficulty incident to the said patented lathe, in which the clamps were not only expansive in transverse directions, but while being clamped on a piece of wire were movable in a longitudinal direction—that is to say, they were retracted within the arbor by means of a screw and a hand-wheel or nut screwed thereon. This longitudinal movement of the clamps will occasion a corresponding or nearly corresponding longitudinal movement of the rod while being clamped within the arbor. The smaller the rod may be in diameter the greater will the longitudinal movement of it be likely to be. At any rate, it will be more or less irregular or uncertain. Often when articles of given length are to be turned by a tool held by a slide-rest working at right angles with the axis of the arbor, this longitudinal movement of the clamp becomes very inconvenient, for on account of variation in the diameter of the wire the operation of clamping the wire will cause it to be drawn more or less longitudinally out of place, or away from the gage against which its end may be placed. Thus for turning pillars and screws for watches, and for fine work in general, where there is to be equality of dimensions in pieces of one kind, the patented lathe is objectionable or cannot be used with proper advantage and certainty.

In carrying out my invention, the clamp though expansible transversely, is stationary in longitudinal directions relatively to the arbor, and is contracted by means of a movable socketed annulus sliding in or on the arbor, and moved by means of a screw and a nut, the whole being substantially as hereinafter described, and as exhibited in the accompanying drawings.

In such drawings, A denotes the spindle or arbor as mounted in bearings $b$ $b'$ of the lathe-head stock B, and being tubular from end to end, or, in other words, having a passage, $a$, extending axially through it.

C is the tubular expansive clamp, which is conical or tapering, as shown at $c$ $c$, and cylindrical in the rear thereof, as shown at $d$ $d$, except in having a male screw, $d'$, at its termination. The said male screw is screwed into the arbor, which is formed with a cylindrical socket, $e$, for the reception of the part $d$, which for about one-half of its length extends into such socket. The object of the socket is to steady the clamp or keep its axis coincident with that of the arbor. The front part of the clamp C terminates in jaws, and such clamp is split or sawed lengthwise, as shown at $g$, between the jaws, so as to enable them to spring apart as occasion may require. A contractor or socketed tube, D, slides within a cylindrical chamber, $h$, formed within the front part of the arbor A, and concentrically with its axis. This contractor D encompasses the conical part $c$ of the clamp C, and is kept in place within the chamber $h$ by a screw, $i$, which is screwed into the arbor, and so as to project into a recess, $k$, formed in the contractor D. A male screw, $l$, is cut on the arbor, or that part of it containing or encompassing the chamber $h$, a milled nut, E, being screwed on the said male screw and against a ring, $m$, which is interposed between it and the head $n$ of the contractor D. By revolving the nut $e$ in one direction, the contractor will be forced toward the jaws $f$ $f$, and by its action on the cone $c$ thereof will contract the clamp or force the jaws toward one another. During a reverse movement of the nut the elasticity of the contracted parts of the clamp will cause them to expand or move apart from one another.

From the above it will be seen that the clamp C has no longitudinal motion relatively to the arbor, and consequently during the act of seizing a rod it will center it without causing any back-draft of it.

I do not claim the subjects of the patent to which reference has hereinbefore been made.

What I claim as my invention is—

1. The combination as well as the arrangement of the sliding contractor D and its operative mechanism or screws E and $l$ with the tubular arbor A and the clamp C, having the cone $c$, and being fixed to the arbor so as to operate therewith, substantially as described.

2. The combination of the chamber $h$ and the socket $e$ with the tubular arbor A, the tubular clamp C, and its contractor D, provided with screws E and $l$, constructed, combined, and arranged substantially as set forth.

JOHN STARK.

Witnesses:
  R. H. EDDY,
  F. P. HALE, Jr.